United States Patent [19]
Ohlson et al.

[11] 3,742,002

[45] June 26, 1973

[54] IRON CHELATES USEFUL FOR SUPPLYING IRON TO PLANTS GROWING IN CALCAREOUS SOIL

[75] Inventors: John L. Ohlson, Bedford; Patricia M. Scanlon, Arlington, both of Mass.; Roger R. Gaudette, Hudson, N.H.

[73] Assignee: W. R. Grace & Co., New York, N.Y.

[22] Filed: June 14, 1971

[21] Appl. No.: 153,038

[52] U.S. Cl. ............... 260/439 R, 29/81 R, 71/97, 260/429 J, 260/438.1, 260/509, 260/519
[51] Int. Cl. C07f 15/02, C07c 143/64, C07c 101/72
[58] Field of Search ............... 260/509, 519, 429 J, 260/439 R, 438.1

[56] References Cited
UNITED STATES PATENTS

| | | | |
|---|---|---|---|
| 2,717,263 | 9/1955 | McKinney et al. | 260/519 |
| 2,967,196 | 1/1961 | Kroll et al. | 260/507 |
| 3,394,174 | 7/1968 | Feigin | 260/509 |
| 3,463,799 | 8/1969 | Szaua et al. | 260/429 J |
| 3,632,637 | 1/1972 | Martell | 260/429 J |

*Primary Examiner*—Daniel E. Wyman
*Assistant Examiner*—A. P. Demers
*Attorney*—Elton Fisher et al.

[57] ABSTRACT

Iron chelates useful for supplying iron to plants growing in calcareous iron deficient soil are prepared by admixing an iron(II) or iron(III) compound with a compound formed by reacting a slat of an $\alpha$-amino acid having the formula $H_2NC(Z)HCOOH$ wherein Z is hydrogen, a lower alkyl group, a phenyl group, an aralkyl group having 7–10 carbon atoms, an alkaryl group having 7–10 carbon atoms, or a cycloalkyl group having 3–8 carbon atoms with formaldehyde and a phenol having the formula $X\text{-}C_6H_4\text{-}OH$ where X is $-SO_3M$, $-COOM$, or an alkyl group having about 1–4 carbon atoms, and M is a member selected from a second group consisting of an alkali metal cation, $H\overset{+}{N}\equiv(CH_2CH_2OH)_3$, and A, wherein A is one half of an alkaline earth metal cation.

18 Claims, No Drawings

IRON CHELATES USEFUL FOR SUPPLYING IRON TO PLANTS GROWING IN CALCAREOUS SOIL

BACKGROUND OF THE INVENTION

This invention is in the field of iron chelates useful for supplying iron to plants suffering from iron chlorosis. Said chelates are especially useful for supplying iron to chlorotic plants growing in calcareous soil. More specifically, this invention is directed to iron chelates recited in the following summary, to the compounds recited in Embodiment A, infra, and to the preparation of said compounds. Said compounds are also useful for removing iron "rust" stains from materials such as cloth, ceramic materials, porcelain surfaces, and the like. Said compounds are highly effective for this purpose over a pH range of about 2–10 or higher. Surprisingly, the compounds of this invention give excellent results where used to remove "rust" stains even at pH 7, a pH at which prior art materials are ineffective.

U.S. Pat. No. 2,921,847 (Knell and Kroll, 71/1), U.S. Pat. No. 3,038,793 (Kroll et al., 71/1), and U.S. Pat. No. 3,463,799 (Szava, Magdoina, and Totos, 260/429) disclose prior art materials suitable for treating iron deficiency (iron chlorosis) in growing plants.

SUMMARY OF THE INVENTION

In summary, this invention is directed to an iron, copper, manganese, cobalt, or nickel chelate of a compound having the formula

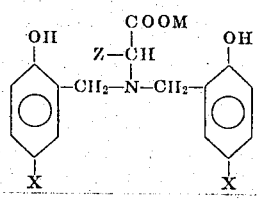

wherein;
a. X is a member selected from a first group consisting of $-SO_3M$, $-COOM$, and an alkyl group having about 1–4 carbon atoms;
b. M is a member selected from a second group consisting of an alkali metal cation, $H\overset{+}{N} \equiv (CH_2CH_2OH)_3$, and A, wherein A is one-half of an alkaline earth metal cation; and
c. Z is hydrogen, a lower alkyl radical, a phenyl radical, an aralkyl radical having 7–10 carbon atoms, an alkaryl radical having 7–10 carbon atoms, or a cycloalkyl radical having 3–8 carbon atoms.

DESCRIPTION OF PREFERRED EMBODIMENTS

In preferred embodiments of the chelate of the above Summary this invention is directed to:
1. The iron chelate of said Summary in which M is sodium.
2. The iron chelate of said Summary in which X is $-SO_3Na$.
3. The iron chelate of said Summary in which X is $-COONa$.
4. The iron chelate of said Summary in which X is $-CH_3$.
5. The iron chelate of said Summary in which the iron is iron (III).
6. The iron chelate of said Summary in which iron is iron (II).
7. The iron chelate of said Summary in which Z is hydrogen, a methyl radical, a phenyl radical, or an isopropyl radical.

In another preferred embodiment ("Embodiment A") this invention is directed to a compound having the formula

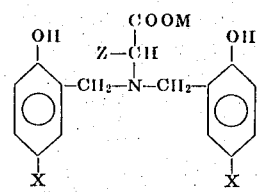

wherein;
a. X is a member selected from a first group consisting of $-SO_3M$, $-COOM$, and an alkyl group having about 1–4 carbon atoms;
b. M is a member selected from a second group consisting of an alkali metal cation, $H\overset{+}{N} \equiv (CH_2CH_2OH)_3$, and A, wherein A is one-half of an alkaline earth metal cation; and
c. Z is hydrogen, a lower alkyl radical, a phenyl radical, an aralkyl radical having 7–10 carbon atoms, an alkaryl radical having 7–10 carbon atoms, or a cycloalkyl radical having 3–8 carbon atoms. In preferred embodiments of Embodiment A, supra, this invention is directed to:
1. The compound of Embodiment A in which M is sodium.
2. The compound of Embodiment A in which X is $-SO_3Na$.
3. The compound of Embodiment A in which X is $-COONa$.
4. The compound of Embodiment A in which X is $-CH_3$.
5. The compound of Embodiment A in which Z is hydrogen, a methyl radical, a phenyl radical, or an isopropyl radical.

In another preferred embodiment ("Embodiment B") this invention is directed to a process for preparing a product compound (a chelating agent) having the formula:

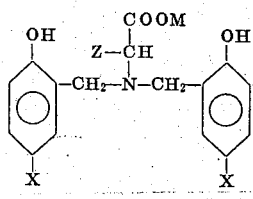

wherein; X is a member selected from a first group consisting of $-SO_3M$, $-COOM$, and an alkyl group having about 1–4 carbon atoms; M is a member selected from a third group consisting of an alkali metal cation, $H\overset{+}{N} \equiv (CH_2CH_2OH)_3$, and A, wherein A is one-half of an alkaline earth metal cation; and Z is a member selected from a third group consisting of hydrogen, a lower alkyl radical, a phenyl radical, an aralkyl radical having 7–10 carbon atoms, an alkaryl radical having 7–10 carbon atoms, and a cycloalkyl radical having 3–8 carbon atoms, said process comprising:

a. admixing in an aqueous medium which can be water or water admixed with a water soluble non-aqueous solvent such as methyl alcohol, ethyl alcohol, isopropyl alcohol, n-propyl alcohol, dioxane, acetone, dimethyl sulfoxide, or the like (up to as much as about 50–65 percent or more (e.g., up to about 75 percent or more) of the aqueous medium can be water soluble non-aqueous solvent (or a mixture of two or more water soluble non-aqueous solvents)); (i) a first reactant having the formula $H_2NC(Z)HCOOM$: (ii) a second reactant selected from a third group consisting of

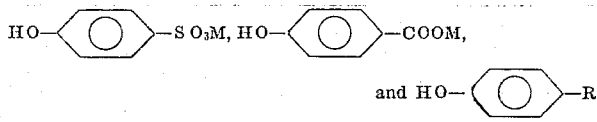

where $R$ is an alkyl group having about 1–4 carbon atoms; and (iii) formaldehyde which can be added as an aqueous solution (e.g., an aqueous solution analyzing about 15–55 percent HCHO by weight) the weight ratio of first reactant to aqueous medium being about 1:10–30 (preferably about 1:20); however, the ratio is not critical and can be varied over wider limits providing enough aqueous medium is used to prevent precipitation of reactants before reaction has a chance to occur (water added with reactants (e.g., as HCHO solution) makes up part of the aqueous medium), the mole ratio of first reactant to second reactant being about 1:1–3 (preferably about 1:2) and the mole ratio of first reactant to the formaldehyde, calculated as HCHO, being about 1:1–3 (preferably about 1:2) to form an aqueous mixture (the mole ratio of first reactant to second reactant and the mole ratio of either first reactant or second reactant to formaldehyde are not critical; however, if an excess of one or two of the reactants (formaldehyde is a reactant) over that required by the stoichiometry (which requires 1 mole of first reactant ($H_2NC(Z)HCOOM$) for each; (a) 2 moles of second reactant; and (b) 2 moles of formaldehyde) is present, the excess quantity of reactant (or reactants) added in excess is unreacted, thereby to add to the cost of the process and to reduce the purity of the product compound);

b. maintaining the aqueous mixture at about 60°–80° C. (preferably about 65°–75° C.) for about 3–17 hours (preferably about 4–5 hours) and preferably in a closed system or in a system provided with substantially total reflux (i.e., a system wherein substantially all material vaporized from the heated mixture is condensed and returned thereto) to form the product compound (residence ("reaction") times and reaction temperatures are not critical; however, conversion (one pass yield) and purity of product decrease if temperatures too far different from those specified are used and substantially no product is obtained after even 60 hours at about 15° C. and conversion is decreased if residence time is cut too short), and recovering the product solution; or c. separating and recovering the product compound (e.g., by evaporating substantially all of the solvent therefrom, or by evaporating a substantial portion of the solvent therefrom and cooling the resulting concentrated solution (e.g., to about room temperature or lower) to crystallize the product compound therefrom). In preferred embodiments of the process of Embodiment B, supra:

1. The product compound is prepared by a process wherein:
    a. the first reactant, the formaldehyde, and a portion of the aqueous medium are admixed, the weight ratio of first reactant to aqueous medium being about 1:2–10 (preferably about 1:4.5–5.5), to form a first solution;
    b. the second reactant and the remaining portion of the aqueous medium are admixed to form a second solution;
    c. the first solution and the second solution are admixed over a period of about ¼–4 hours (preferably about 1–2 hours) while maintaining the resulting mixture at about 70°–80° C. (preferably about 72°–74° C.), and subsequent to completion of the admixing, maintaining the resulting mixture within the aforesaid temperature range for about 2–14 hours (preferably about 3–4 hours) to form the product compound.
2. M is sodium.
3. X is $-SO_3Na$.
4. X is $-COONa$.
5. X is $-CH_3$.
6. Z is H.
7. Z is $-CH_3$.
8. Z is

9. Z is $-CH(CH_3)_2$.

DETAILED DESCRIPTION OF THE INVENTION

This invention is directed to the metal chelates recited in the above Summary. Said chelates are excellent materials for supplying trace elements (e.g., copper, manganese, cobalt) and iron to growing plants (e.g., beans, peas, soybeans, tomatoes, peppers, and the like) including plants growing in calcareous soil. These chelates are also useful to supply metallic ions in low but substantially constant concentration to electroplating baths.

This invention is also directed to compounds having the formula recited in the above Embodiment A, said compounds being excellent materials for chelating iron (II) and iron (III) compounds - including such iron compounds where present as "rust" stains on cloth, ceramic materials, porcelain and other surfaces, and the like.

In iron chlorosis (a plant malnutrional condition caused by iron deficiency) the area of a leaf between its veins is a marked yellow green in contrast to the dark green of the veins. In advanced iron deficiency, this contrast is lacking and instead the leaves have an ivory color, the plants become partially defoliated, and as a terminal result, die. Such iron deficiency can be caused by any of several factors. Some of these are; (1) an actual deficiency of iron in the soil; (2) high manganese and copper contents of the soil; and (3) an alkaline soil (pH above 7), which can be caused by a high soil content of calcium carbonate.

Although the value of EDTA (ethylenediaminetetraacetic acid) is recognized and utilized in agriculture and industry, the EDTA chelates of tri- and tetravalent metal ions are unstable in neutral and alkaline solutions, and these metal chelates hydrolyze in water to form insoluble metal hydroxides or hydrated metal oxides. The monosodium salt of the iron (III) EDTA chelate decomposes in aqueous solutions at pH 8 to iron (III) hydroxide and a soluble EDTA salt. This behavior imposes a serious limitation on the use of EDTA. The iron (III) EDTA chelate is effective in correcting iron deficiencies in plants grown on acid soils. However, in alkaline soils, this compound is economically ineffective in treating iron deficiency. Soil scientists have established that in alkaline soils iron (III) EDTA decomposes to liberate the iron as an insoluble iron (III) oxide or hydroxide in which form the metal ion cannot be absorbed by the root system of the plant and therefore is not available for plant nutrition. In order to overcome this defect of alkaline soils, the iron chelate of hydroxyethylethylenediaminetriacetic acid has also been recommended for plant nutrition, and although it is somewhat better than the EDTA chelate, it is economically ineffective for correcting iron chlorosis in calcareous soils.

A primary object of this invention is to provide iron chelates which are free of the aforedescribed deficiencies.

While the iron chelates of this invention can be applied to growing plants as an aqueous spray we prefer to apply these chelates to the soil.

In general, normal methods of applying micronutrients are followed with our iron chelate and other chelates. Our iron chelate (and our other chelates) can be mixed with water and applied as a liquid early in the growing season or applied to an absorbent earth which is subsequently applied to soil either with or without other fertilizers. We have found that one to four pounds of iron as the iron chelate per acre gives excellent results.

Because of our disclosure various other techniques for applying iron chelates to soil will be readily apparent to those skilled in the art.

A preferred technique for removing "rust" stains from a ceramic surface with the chelating compounds of our invention (i.e., the compounds disclosed in the above Embodiment A) comprises allowing the rust covered surface to remain in contact with a solution of the chelating agent until the rust has been removed. It has been our experience that rust stains seem to differ greatly on their ease of removal. Presumably, this is related to the manner in which the stains were deposited or formed. It has been possible to remove rust stains simply by rubbing the stain with a 10 percent aqueous solution of the chelating agent on a rag or sponge. In other instances, it has been necessary to allow time for the chelating agent to act for a longer period. In these instances we can use several applications of a solution of the chelating agent or several "spongings" can be used. In most instances, heat accelerates the rust removal reaction.

A preferred technique for removing rust stains from cloth is to immerse the soiled cloth in an aqueous solution of our chelating agent (e.g., 0.25–10 percent by weight of our chelating agent) and allow the solution to remain in contact with the cloth until the stain is removed. This technique is excellent for removing rust stains from a soiled garment, a towel, or the like, but is too slow for use in textile manufacturing because cloth manufacturers prefer to use a fixed machine speed. In this instance, we prefer to add the chelating agent to a scouring bath where said agent prevents the formation of rust stains on the cloth.

Because of our disclosure, various other techniques for removing rust stains with the compounds of our invention will be readily apparent to those skilled in the art.

The compounds which are disclosed in our Embodiment A, supra are also excellent materials for removing iron rust and iron scale from steel including steel pipes, steel chains, steel tools, and the like. A preferred technique for removing rust and scale from a steel pipe comprises circulating a 5 percent to 10 percent aqueous solution of the chelating agent through the pipe until rust removal has been completed. In the case of chains, simply immersing the rusty chain in a 10 percent solution of the chelating agent will cause the rust to be dissolved (converted to an iron chelate) leaving an essentially rust free chain. We prefer to operate between pH 2 and 9. Rust removal is most rapid at these pH's.

One of the most interesting properties of our chelating agent is that at about pH 8.3 it does not attack aluminum. This can be valuable when a composite of iron and aluminum require removal of rust from the iron with no action on the aluminum - e.g., where cleaning motors or engines where both steel and aluminum parts are present.

Because of our disclosure, other techniques for removing rust and scale from steel articles will be readily apparent to those skilled in the art.

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE I

One tenth mole of glycine (7.5 grams) was mixed with 7.5 g of water and 8 g of 50 percent NaOH and then 40 g of methanol was added. A complete solution resulted; 16.7 g of a 37 percent aqueous formaldehyde solution (0.2 mole HCHO) was added thereto and the resulting mixture was warmed to about 40° C.

0.2 mole (46.4 g) of sodium p-hydroxybenzene sulfonate dihydrate was added to a mixture of 76 g of methanol and 42 g of water in a stirred flask equipped with a reflux condenser and glascol heating mantle. This mixture was then heated to refluxing and the glycine-formaldehyde solution added dropwise while keeping the resulting mixture refluxing. It took about one hour for the addition. The resulting solution was refluxed for 14 hours during which time a solid deposited. The product mixture was then evaporated to dryness to obtain the product which was identified as

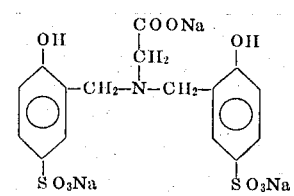

(hereinafter called "Chelating Agent No. 1") by elemental analysis and titration (after conversion to the free acid). Conversion (one pass yield) was about 80 percent of theory.

EXAMPLE II 7.5 grams of glycine (0.1 mole) was added to 40 ml of water and then 8 g of 50 percent NaOH (0.1 mole) was added. The resulting mixture was heated to 50° C. and 16.7 g of a 37 percent aqueous formaldehyde solution (0.2 mole HCHO) was added.

46.4 g of sodium p-hydroxybenzene sulfonate dihydrate (0.2 mole) was placed in 115 ml of water and heated to 72°–75° C.

The glycine-formaldehyde solution was then added to the sulfonate solution over a one hour period while maintaining the resulting mixture at about 72°–75° C. The resulting mixture was kept at 72°–75° C. for an additional 3.75 hours; it was then cooled and recovered as a solution of the product.

EXAMPLE III

Several large batches of Chelating Agent No. 1 (described supra) were prepared by the general procedure of Example I, but modifying the procedure by using in each run 100 times the quantities of reactants and solvents specified in Example I and by conducting each run in a glass lined steel reactor provided with heating and cooling coils, a mechanical stirrer, and a reflux condenser. Evaporation to dryness was accomplished in a steam heated glass lined steel evaporation vat.

A 1,026 g portion (1mole) of Chelating Agent No. 1 was dissolved in 1,500 ml of water. While agitating the thus formed solution of Chelating Agent No. 1 there was added thereto 439.9 of a 37 percent aqueous solution of FeCl₃ (i.e., an amount of the solution to provide 1 mole (162.2) of FeCl₃) while adding sodium hydroxide solution (ca. 50 percent NaOH) as required to maintain the pH of the resulting mixture at about 8–8.5 to form a solution of the iron (III) chelate of Chelating Agent No. 1. Said solution of iron (III) chelate was labeled "Solution No. 1."

One-half of Solution No. 1 was evaporated to dryness to yield the iron (III) chelate of Chelating Agent No. 1 as a solid. Said solid was crushed and screened to pass about a 16 mesh screen (U.S. Standard). The screened material was labeled "Solid Chelate No. 1." Particle size is not critical to our invention but crushing and screening were used for ease of application to the soil.

EXAMPLE IV

Two rows of a species of soybeans which is highly chlorotic and which demands more iron than a normal species of soybeans were planted in a very calcareous soil (pH, ca.8). During the growing season two applications of Solid Chelate No. 1, described supra, were made to one row at a rate to provide about 2 pounds of iron (as Fe) per acre per application while none of said solid chelate was applied to the other row. Except for the applications of said chelate the two rows of soybeans received identical fertilization.

The bean plants which were treated with the chelate were greener and larger than those which were not treated and when harvested the soybeans from the row of treated plants weighed three times as much as those from the row of plants which was not treated with the iron chelate. Both rows were the same length and had the same number of soybean plants growing therein.

In other runs the general procedure of Example I was repeated but modified by replacing the sodium salt of p-hydroxybenezenesulfonic acid with the sodium salt of p-hydroxybenzoic acid, p-cresol, p-n-propylphenol, and p-isopropylphenol. The products were aqueous solutions of the compound of Embodiment A, supra, in which "X" was -COONa, -CH₃, -CH₂CH₂CH₃, and

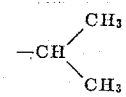

respectively.

EXAMPLE V

A 0.2 mole portion of the sodium salt of p-phenolsulfonic acid dihydrate was dissolved in a mixture of 40 ml of water and 95 ml of methanol in a 500 ml round bottom flask equipped with a stirrer, a condenser, an addition funnel, and a thermowell to form a first reactant solution.

A 0.1 mole portion of dl-α-alanine was admixed with 8 g of a 50 percent aqueous sodium hydroxide solution (0.1 mole NaOH) and 7.5 ml of methanol. This mixture was heated gently until the alanine dissolved (at about 50° C.) to form a second reactant solution. The second reactant solution was brought to about 50° C. and 16.2 g of an aqueous formaldehyde solution (37 percent HCHO), to provide 0.2 mole of HCHO, was added thereto to form a third reactant solution.

The first reactant solution was heated to boiling and while it refluxed gently the third reactant solution was added thereto over a period of 1.75 hour. Refluxing was continued for 13.5 hours. The thus reacted mixture was evaporated to dryness and the solid residue was dried to substantially constant weight at 120° C. Said residue was identified as

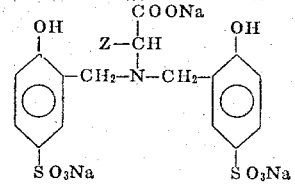

in which Z is -CH₃.

EXAMPLE VI

The general procedure of Example V was repeated. However, in this instance the procedure was modified by replacing the alanine with 0.1 of dl-α-phenylglycine. In this instance it was necessary to heat the aqueous-methanol-NaOH-amino acid mixture to about 65°–70° C. to obtain complete solution of the amino acid where forming the second reactant solution, and the second reactant solution was maintained at about 65°–70° C. while adding the formaldehyde thereto to form the third reactant solution.

The recovered product was found to have the same formula as the product of Example V except that Z in the product of this run (Example VI) was

EXAMPLE VII

The general procedure of Example VI was repeated. However, in this instance the procedure was modified by replacing the phenylglycine with dl-α-valine. The recovered solid product had the same formula as that of Example VI except that Z was -CH(CH$_3$)$_2$. dl-α-valine is dl-α-aminoisovaleric acid.

Iron chelates were formed of the products of Examples V, VI, and VII and each of these chelates was found to be an excellent material for supplying iron to beans, peas, corn, and the like growing in iron deficient calcareous soil.

Salts of a number of other phenols, including those phenols listed in the table, infra, were reacted with dl-α-alanine, dl-α-phenyglycine, and dl-α-valine to form chelating compounds useful for chelating iron to form iron chelates useful for supplying iron to plants growing in calcareous soil.

In another series of runs the general procedure of Example I was repeated but modified by replacing; (a) the sodium salt of p-benzenesulfonic acid with the material labeled "Phenol Used" in the following table; and (b) the sodium hydroxide with the materials labeled "Base Used" in said table. These substitutions resulted in the formation of the compound of Embodiment A, supra, in which the "X" and "M" were as shown under the headings "X" and "M" in said table.

g) of FeCl$_2$. The preparation and recovery of the iron (II) chelate was conducted in the substantial absence of oxygen (i.e., under an atmosphere of nitrogen).

The thus formed iron (II) chelate was found to be an excellent material for supplying iron to plants growing in calcareous soil.

Copper, manganese, cobalt, and nickel chelates of Chelating Agent No. 1 were prepared by the general procedure of Example III wherein the procedure of said example was modified by replacing the FeCl$_3$ solution with aqueous solutions of copper (II) chloride, cobalt (II) sulfate, manganese (II) sulfate, and nickel (II) chloride.

We have found that the particular salt of the element to be chelated is not critical providing said salt is at least slightly soluble (e.g., preferably at least about 1 g or more per 100 ml of water at about 20° C.). We generally prefer to use chloride, sulfate, nitrate, or acetate salts but have used numerous other salts with excellent results.

We have also obtained excellent results where applying solutions of our chelates (e.g., solutions of alkali metal, and triethanolamine salts of the chelates) such as Solution No. 1, described supra, to plants (including soybeans) growing in highly calcareous soil. Application can be made to the soil, or, using a solution sufficiently dilute to avoid burning the plants' leaves, to the

| Phenol used | Base used | X | M |
|---|---|---|---|
|  HO—⟨O⟩—SO$_3$K | KOH | —SO$_3$K | K$^+$ |
| HO—⟨O⟩—SO$_3$Li | LiOH | —SO$_3$Li | Li$^+$ |
| (HO—⟨O⟩—SO$_3$)$_2$Ca | Ca(OH)$_2$ | —SO$_3$Ca$_{1/2}$ | (Ca$^{++}$)½ |
| HO—⟨O⟩—COOK | KOH | —COOK | K$^+$ |
| HO—⟨O⟩—COOHN≡(CH$_2$CH$_2$OH)$_3$ | N≡(CH$_2$CH$_2$OH)$_3$ | —COOHN≡(CH$_2$CH$_2$OH)$_3$ | HN$^+$≡(CH$_2$CH$_2$OH)$_3$ |
| HO—⟨O⟩—SO$_3$HN≡(CH$_2$CH$_2$OH)$_3$ | N≡(CH$_2$CH$_2$OH)$_3$ | —SO$_3$HN≡(CH$_2$CH$_2$OH)$_3$ | HN$^+$≡(CH$_2$CH$_2$OH)$_3$ |
| HO—⟨O⟩—CH$_2$CH$_2$CH$_3$ | N≡(CH$_2$CH$_2$OH)$_3$ | —CH$_2$CH$_2$CH$_3$ | HN$^+$≡(CH$_2$CH$_2$OH)$_3$ |
| HO—⟨O⟩—CH$_3$ | N≡(CH$_2$CH$_2$OH)$_3$ | —CH$_3$ | HN$^+$≡(CH$_2$CH$_2$OH)$_3$ |
| HO—⟨O⟩—C$_2$H$_5$ | KOH | —C$_2$H$_5$ | K$^+$ |

In other runs the general procedure of Example IV was repeated but modified by replacing the compound of said example with the compounds described in the two paragraphs immediately preceding this paragraph. In each instance, an iron (III) chelate of excellent quality was obtained in high conversion (i.e., a one pass yield of at least 65 percent of theory). These chelates were found to be excellent chelates for supplying iron to plants (including soybeans, peas, peppers, roses, and tomatoes) growing in calcareous soil.

The general procedure of Example III, supra, was used to prepare an iron (II) of Chelating Agent No. 1. In this instance, the procedure of Example III was modified by replacing the FeCl$_3$ solution with a quantity of a 30 percent aqueous FeCl$_2$ to provide 1 mole (126.8 leaves of growing plants (or to both the soil and the leaves).

As used herein, the term "mole" has its generally accepted meaning, i.e., a mole of a substance is that quantity of the substance which contains the same number of molecules of the substance as there are carbon atoms in 12 g of $^{12}$C. A mole of sodium glycinate (the sodium salt of glycine) is 97.05 g.

As used herein, the term "g" means gram (or grams).

Unless otherwise defined where used, the term "percent (%)" means parts per hundred by weight and the term "parts" means parts by weight.

As is well known, a lower alkyl group is an alkyl group (or radical) having 7 or less carbon atoms).

Cyclopropyl, cyclobutyl, and cyclohexyl are typical

We claim:

1. An iron, copper, manganese, cobalt, or nickel chelate of a compound having the formula

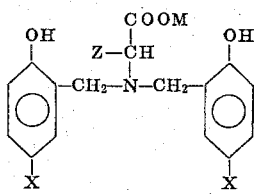

wherein;
a. X is a member selected from a first group consisting of -SO₃M, -COOM, and an alkyl group having 1-4 carbon atoms;
b. M is a member selected from a second group consisting of an alkali metal cation, HN̈(CH₂CH₂OH)₃, and A, wherein A is one-half of an alkaline earth metal cation; and
c. Z is a member selected from a group consisting of hydrogen, a lower alkyl radical, a phenyl radical, a hydrocarbyl aralkyl radical having 7-10 carbon atoms, a hydrocarbyl alkaryl radical having 7-10 carbon atoms, and a cycloalkyl radical having 3-8 carbon atoms.

2. The iron chelate of claim 1 in which M is sodium.
3. The iron chelate of claim 1 in which X is -SO₃Na.
4. The iron chelate of claim 1 in which X is -COONa.
5. The iron chelate of claim 1 in which X is -CH₃.
6. The iron chelate of claim 1 in which the iron is iron (III) and Z is hydrogen, -CH₃,

or -CH(CH₃)₂.

7. The iron chelate of Claim 1 in which the iron is iron (II) and Z is hydrogen, -CH₃,

or -CH(CH₃)₂.

8. A compound having the formula

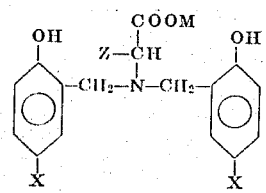

wherein;
a. X is a member selected from a first group consisting of -SO₃M, -COOM, and an alkyl group having 1-4 carbon atoms;
b. M is a member selected from a second group consisting of an alkali metal cation, HN̈ ≡ (CH₂CH₂OH)₃, and A, wherein A is one-half of an alkaline earth metal cation; and
c. Z is a member selected from a group consisting of hydrogen, a lower alkyl radical, a phenyl radical, a hydrocarbyl aralkyl radical having 7-10 carbon atoms, a hydrocarbyl alkaryl radical having 7-10 carbon atoms, and a cycloalkyl radical having 3-8 carbon atoms.

9. The compound of claim 8 in which M is sodium.
10. The compound of claim 8 in which X is -SO₃Na.
11. The compound of claim 8 in which X is -COONa.
12. The compound of claim 8 in which Z is hydrogen, -CH₃,

or -CH(CH₃)₂.

13. A process for preparing the compound of claim 8, comprising:
a. admixing in an aqueous medium; (i) a first reactant having the formula H₂N-C(Z)HCOOM in which Z is hydrogen, a lower alkyl radical, a phenyl radical, a hydrocarbyl aralkyl radical having 7-10 carbon atoms, or a hydrocarbyl alkaryl radical having 7-10 carbon atoms and M is an alkali metal cation, HN̈ ≡7(CH₂CH₂OH)₃, or A, wherein A is one-half of an alkaline earth metal cation; (ii) a second reactant having the formula

in which X is -SO₃M, -COOM, or an alkyl radical having 1-4 carbon atoms; and (iii) formaldehyde, the weight ratio of first reactant to aqueous medium being 1:10-30 to form an aqueous mixture;
b. maintaining the aqueous mixture at 60°-80° C. for about 3-17 hours to form said compound.

14. The process of claim 13 in which;
a. the first reactant, the formaldehyde, and a portion of the aqueous medium are admixed, the weight ratio of first reactant to aqueous medium being 1:2-10 to form a first solution;
b. the second reactant and the remaining portion of the aqueous medium are admixed to form a second solution;
c. the first solution and the second solution are admixed while maintaining the resulting mixture at 70°-80° C., and subsequent to completion of the admixing, maintaining the resulting mixture at 70°-80° C. for 2-14 hours to form the product compound.

15. The process of claim 13 in which M is sodium.
16. The process of claim 13 in which X is -SO₃Na.
17. The process of claim 13 in which X is -COONa.
18. The process of claim 13 in which Z is hydrogen, -CH₃,

or CH(CH₃)₂.

* * * * *